United States Patent
Redd

[11] 3,747,500
[45] July 24, 1973

[54] WINDSHIELD AND WINDSHIELD WIPER DE-ICER

[75] Inventor: Keith L. Redd, Mt. Clemens, Mich.
[73] Assignee: General Motors Corporation, Detroit, Mich.
[22] Filed: Apr. 28, 1972
[21] Appl. No.: 248,418

[52] U.S. Cl. ................................................ 98/2.10
[51] Int. Cl. .............................................. B60h 1/24
[58] Field of Search ...................................... 98/2.1

[56] References Cited
UNITED STATES PATENTS

| | | | |
|---|---|---|---|
| 1,743,395 | 1/1930 | Rinehart | 98/2.10 |
| 1,959,069 | 5/1934 | Sugden | 98/2.10 |
| 2,051,571 | 8/1936 | Raton | 98/2.10 |

*Primary Examiner*—Meyer Perlin
*Attorney*—W. E. Finken and W. A. Schuetz

[57] ABSTRACT

This disclosure relates to a de-icer for the outside of a windshield and windshield wipers of an automotive vehicle having an engine compartment hood movable between open and closed positions. The de-icer comprises a first duct means which is adapted to convey a flow of heated air from a heater means and a second duct means which is formed integrally with the engine compartment hood. The second duct means is adapted to receive and convey the flow of heated air from the first duct means when the hood is in its closed position and to convey the flow of heated air to the windshield. The second duct means has outlet openings for directing the flow of heated air upon the outside of the windshield and the windshield wipers.

4 Claims, 5 Drawing Figures

PATENTED JUL 24 1973 3,747,500

PATENTED JUL 24 1973 3,747,500

WINDSHIELD AND WINDSHIELD WIPER DE-ICER

The present invention relates to a de-icer for an automotive vehicle, and more particularly, to an automotive vehicle de-icer which directs a flow of heated air upon the outside of the vehicle windshield and the vehicle's windshield wipers.

Outside windshield defrosters for automotive vehicles have heretofore been provided wherein ducts positioned within the engine compartment convey a flow of heated air from a heater means to a position adjacent the lower edge of the vehicle windshield and with the heated air being thereafter directed thereon. For example, see U. S. Pat. Nos. 2,187,281; 2,240,013; 2,719,339; and 3,416,428. Further, automotive vehicle windshield defrosters have previously been provided wherein the rearward end of the engine compartment hood can be lifted and repositioned, as desired by the operator, so as to provide an outlet to direct a flow of heater air from the engine compartment of the vehicle against the outside of the vehicle windshield. For example, see U. S. Pat. No. 2,051,571.

An object of the present invention is to provide a new and improved de-icer for the outside of a windshield and the windshield wipers of a vehicle having an engine compartment hood movable between open and closed positions, wherein the de-icer comprises a first duct means which conveys a flow of heated air from a heater means and a second duct means which is formed integrally with the engine compartment hood and which is adapted to receive the flow of heated air from the first duct means when the hood is in its closed position, and wherein the second duct means conveys the flow of heater air to outlet openings adjacent the windshield to direct the flow of heated air upon the outside of the windshield and the windshield wipers.

Another object of the present invention is to provide a new and improved windshield and windshield wiper de-icer as defined in the preceding object and wherein the first duct means comprises a heater takeoff duct for conveying the flow of heated air from the heater means to a vertical duct which in turn conveys the heated air to a position immediately adjacent an inner panel of the hood, the second duct means comprises a thin manifold formed by an outer panel and a shallow embossed impression in the inner panel of the engine compartment hood, and where the second duct means has an inlet vent through the embossed impression which is adapted to abut a sealing means and to communicate with an outlet vent of the first duct means when the hood is in its closed position.

These and other objects of the present invention will become more fully apparent in the following detailed description and drawings wherein.

Figure 1:
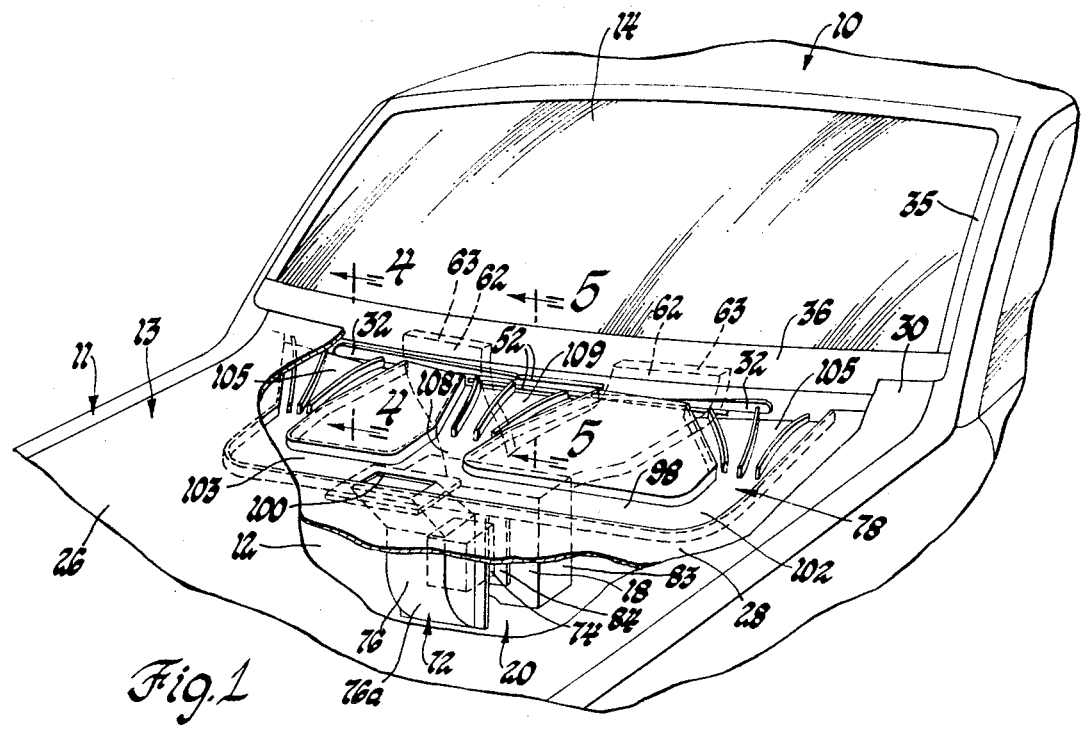
FIG. 1 is a fragmentary perspective view of an automotive vehicle embodying the windshield and windshield wiper de-icer of the present invention.

As representing a preferred embodiment of the present invention, the drawings show an automotive vehicle 10 having a body structure defining an engine compartment 12 and a hood 13 for covering the engine compartment 12. The vehicle 10 also includes a windshield 14, a conventional windshield wiper mechanism 16 which is supported at the lower edge of the windshield 14, a conventional automotive vehicle heater 18, and a windshield and windshield wiper de-icer 20.

Figure 3:
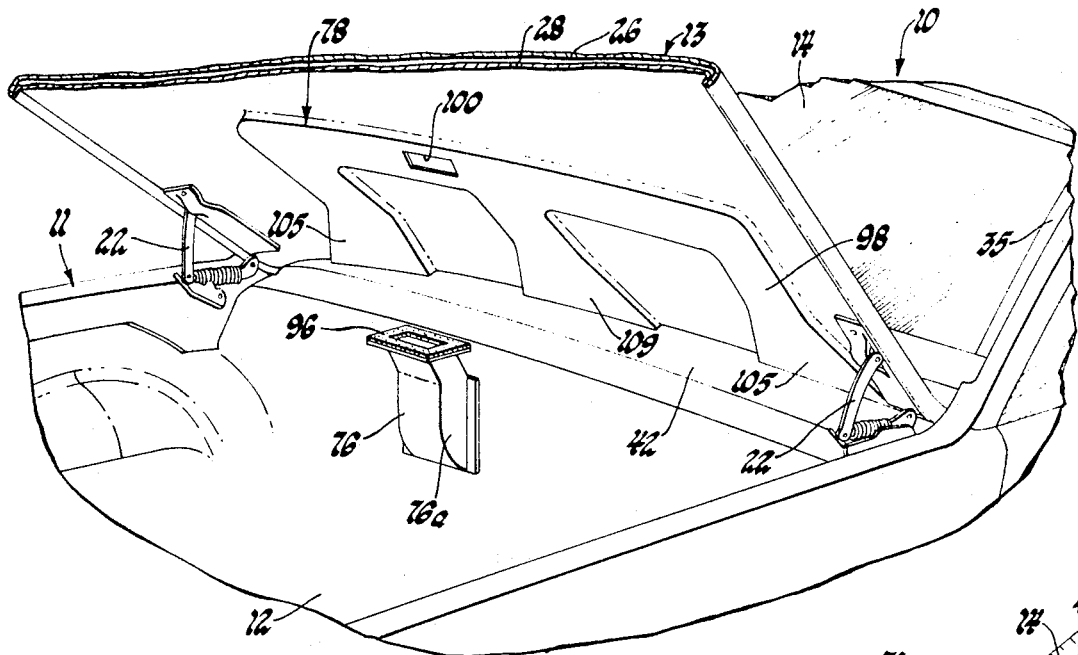
FIG. 3 is yet another fragmentary perspective view of an automotive vehicle embodying the windshield and windshield wiper de-icer of the present invention and with different parts thereof shown in different positions.
Figure 4:
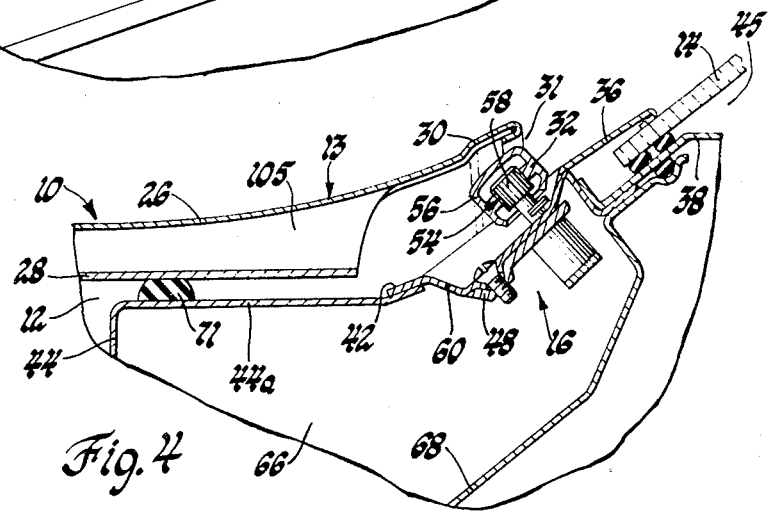
FIG. 4 is a cross-sectional view taken along line 4—3 in FIG. 1.
Figure 5:
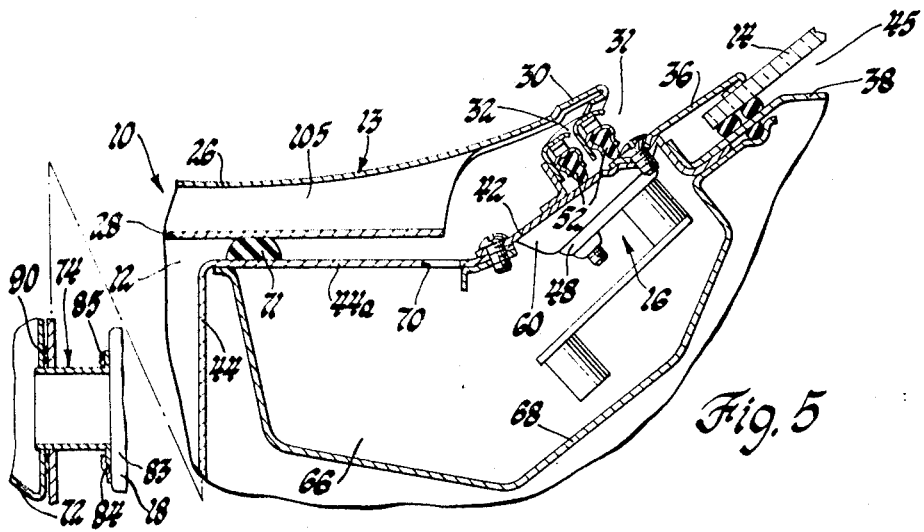
FIG. 5 is a cross-sectional view taken along line 5—5 of FIG. 1.

Referring to FIGS. 3 and 4, the engine compartment hood 13 is shown as being hingedly supported upon the body structure 11 adjacent its outer, rearward corners of the engine compartment 12 via a pair of conventional spring hinges 22. The hood 13 can be manually pivoted about the spring hinges 22 between a closed position, as shown in FIG. 1, and an open position, as shown in FIG. 3. The hood 13 comprises an outer panel 26 and an inner panel 28 which is fixedly secured to the underside of the outer panel 26 by what is herein shown as hem flanging. The rearward end portion 30 of the engine compartment hood 13 curves upwardly, as shown in FIGS. 4 and 5, and extends to a position adjacent, but slightly spaced from and above the windshield wiper mechanism 16 at the lower edge of the vehicle windshield 14. Accordingly, the rearward end portion 30 of the hood 13 covers the windshield wiper mechanism 16 and defines with the lower edge of the windshield a transversely extending slot 31 in which the windshield wiper arms 32 are disposed when in their parked position so as to be "hidden" or concealed from view.

The windshield 14 is supported by the body structure 11 and is peripherally surrounded by reveal molding 35, the lower portion 36 of which extends transversely across the lower edge of the windshield 14 in a ramp-like manner and in an overlapping relationship therewith. In this respect, the windshield 14 is sandwiched at its lower edge between the body inner cowl panel 38 and the lower portion 36 of the reveal molding 35. Further, an inner support panel 42 extends between the cowl panel 38 and the firewall 44 which separates the engine compartment 12 from the passenger compartment 45. The support panel 42 also extends transversely across the body structure 11 and along the lower edge of the windshield 14 for substantially its entire length.

The windshield wiper mechanism 16, as shown in FIGS. 4 and 5, is supported upon an inner support panel 42 and comprises a conventional drive mechanism 48, as shown in FIG. 5, which is mounted in any suitable manner to the underside of the support panel 42. The windshield wiper arms 32 support wiper blades 52 at their free ends in a conventional manner and have their other ends fixedly supported upon drive pivot 54. The other end of the windshield wiper arms 32 has a cup-like interiorly splined connector 56 which is slidably received in splinged engagement upon the head 58 of the drive pivots 54. The drive pivots 54 extend through saucer-like depressions 60 in the support panel 42 at positions adjacent the passengers and drivers sides of the vehicle's windshield 14. In operation, the drive pivots 54 are alternately rotated in opposite directions by the drive mechanism 48 in order to pivot the windshield wiper arms 32 and wiper blades 52 in a reciprocating manner across the vehicle windshield 14.

Further, the windshield wiper mechanism 16 is herein shown as having its wiper arms 32 and blades 52 parked in an overlapping relationship within the transversely extending slot 31 such that, as was previously described, the windshield wiper arms 50 and wiper blades 52 are "hidden." However, the scope of this invention should in no way be limited to wiper mechanisms operating in phase opposition and should be considered also applicable to wiper mechanisms operating and parking in a tandem relationship. Also, it should be noted that the ramp-like lower portion 36 of the reveal molding 35 is traversed by the wiper blades 52 when moving to and from their parked position.

The vehicle's heater 18, as best shown in FIG. 1, is supported in any suitable manner upon the passenger compartment side of the firewall 44. Still referring to FIG. 1, the heater 18 is shown as also including a pair of ducts 62 which extend upwardly thorugh the dash panel (not shown) of the vehicle 10 and which terminate in a pair of outlets or vents 63 immediately adjacent the lower end of the inside of the vehicle windshield 14 in order to direct a flow of heated air from the heater 18 to defrost the inside of the vehicle windshield 14. The heater 18 draws a supply of air from the exterior of the vehicle 10 via the slot 31 and the plenum chamber 66. The plenum chamber 66 is located between the firewall 44, support panel 42, and a cup-like plenum wall 68 which extends from adjacent the body inner cowl panel 38 to the firewall 44. The plenum chamber 66 has a vent opening 70 at its top side which communicates with the atmosphere via the slot 31. The plenum chamber 66 is connected with the heater 18 via duct means (not shown). The engine compartment 12 is sealed from the plenum chamber 66 when the hood 13 is in its closed position by a rubber seal strip 71 which extends transversely across the upper horizontal portion 44a of the firewall 44.

The windshield and windshield wiper de-icer 20 of the present invention broadly comprises a first duct means 72 which includes a heater take off duct 74 sealingly connected with the outlet side of the vehicle heater 18 and a vertical duct 76 which extends upwardly to a position adjacent the engine compartment hood 13. The de-icer 20 also includes a second duct means 78 which is integral with the hood 13 and which is adapted to distribute a flow of heated air received from the heater 18 and a first duct means 72 onto the outside of the vehicle windshield 14 and the windshield wiper arms 32 and blades 52.

Figure 2:
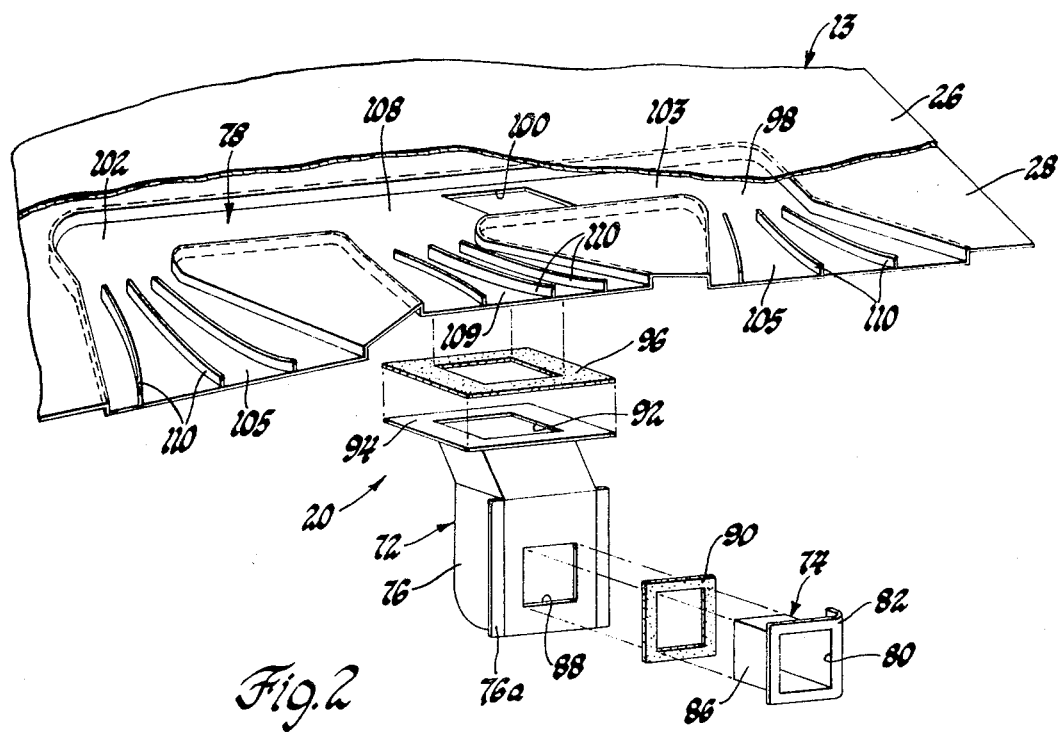
FIG. 2 is an exploded perspective view of the windshield and windshield wiper de-icer of the present invention.

Referring to FIGS. 1 and 2, the heater take off duct 74 of the first duct means 72 defines a generally square passageway when viewed in cross-section which receives and conveys the flow of heated air from the outlet side of the heater 18. The heater take off duct 74 has an inlet opening 80 and a flange 82 which extends radially outwardly therefrom. Referring to FIG. 5, the inlet opening 80 of the heater take off duct 74 is positioned over the outlet opening (not shown) of the heater 18 by sliding the lower portion of the flange 82 into a complementary shaped pocket adjacent the outlet opening (not shown) of the heater 18 which is defined between the housing 83 of the heater and a bent flange 84 attached thereto. The inlet opening 80 is retained over the outlet opening (not shown) of the heater 18 by attaching other portions of the flange 82 by suitable fastening means 85, herein shown as screws, to the housing 83 of the heater 18. The heater take off duct 74 extends from the heater 18 through the firewall 44 of the vehicle 10 and has its outlet end 86 received within a complementary shaped inlet 88 in the vertical duct 76 which in turn has its lower portion 76A supported in any suitable fashion upon the engine compartment side of the firewall 44. A rubber seal or gasket 90 is received upon the heater take off duct 74 adjacent its outlet 86 and is sandwiched between the lower portion 76 of the vertical duct 76 and the firewall 44 to seal the connection between the outlet 86 of the heater take off duct 74 and the inlet 88 of the vertical duct 76.

The vertical duct 76 extends upwardly from its inlet 88 and forms a passageway to convey the flow of heated air received from the heater take off duct 74. The vertical duct 76 terminates in an outlet 92 immediately adjacent the inner panel 28 of the engine compartment hood 13 and which also includes a flange 94 which extends radially outwardly from the outlet 92. The flange 94 provides a support for another rubber seal or gasket 96 which is secured thereon and which is generally complementary in shape to the flange 96 of the vertical duct 76, as shown in FIG. 2.

Referring to FIGS. 1 and 2, the second duct means 78 is formed integrally with the engine compartment hood 13 and is adapted to receive the flow of heated air from the duct 76 when the hood 13 is in its closed position in order to direct the flow of heater air onto the windshield 14 and windshield wipers 50. The second duct means 78 is a generally W-shaped flat manifold which is defined in the engine compartment hood 13 between the outer panel 26 and a W-shaped shallow embossed depression 98 formed from the central portion of the inner panel 28 and extending to the rearward edge 30 of the hood 13. The inner panel 28 of the hood 13 has an opening therein generally complementary in shape to the outlet 92 of the duct chamber 96 to provide an inlet 100 for the second duct means 78. The inlet 100 is aligned with the outlet 92 of the vertical duct 76 when the engine compartment hood 13 is in its closed position in order to receive the flow of heated air therefrom. Further, the rubber seal 96 is compressed between the flange 94 of the vertical duct 76 in the inner panel 28 of the hood 13 and thereby serves to seal the communication between the outlet 96 and inlet 100. The second duct means 78 has first and second chamber portions 102 and 103, which extend transversely from the central portion of the hood 13 and the inlet 100, toward the outer side portions of the hood 13 and which thereafter extend longitudinally toward the rearward end 30 of the hood 13. Both the first and second chamber portions 102 and 103 terminate in flared outlet vents 105 immediately adjacent the rearward end 30 of the hood 13 and the lower outside edge of the vehicle windshield 14. In this respect, the vents 105 are adapted to direct the flow of heated air received from the vertical duct 76 directly upon the windshield wiper arms 32 and the outside of the vehicle windshield 14. The second duct means 78 also includes a third chamber portion 108 which extends longitudinally within the hood 13 from the central portion thereof and the inlet 100. The third chamber portion 108 similarly terminates in a flared outlet vent 109 immediately adjacent the rearward end 30 of the hood 14 and the windshield wiper blades 52 when in their park position. In this respect, the front outlet vent 109 is adapted to direct the flow of heated air upon the windshield wiper blades 52 and the outside of the vehicle windshield 14.

Each of the vents 105 and 109 includes a plurality of arcuately shaped deflector fins 110 which serve to direct the flow of heater air in a flaring or diverging pattern upwardly through the vehicle body opening 46.

The de-icer of the present invention is readily adaptable to a windshield wiper system operating and parking in a tandem relationship by merely revising the shape of the second duct means 78 from the above describe W-shape to either one having four chamber portions resulting in a vent outlet adjacent each wiper blade 52 and each wiper arm 32 or one having a single outlet vent substantially co-extensive with the rearward edge 30 of the hood 13. Accordingly, the scope of the present invention should not be limited to the previously described second duct means 78 which is designed primarily for phase opposition wiper systems. Further, it should be understood that the second duct means, rather than being formed by the inner panel 28 and outer panel 26 of the hood 13, could take the form of a separate duct attached by suitable means to the underside of the hood.

It should alse be noted that when the engine compartment hood 13 is manually pivoted to its open position, as shown in FIG. 3, communication between the second duct means 78 and the duct chamber 76 is broken, as shown in FIG. 3.

In operation, a flow of heated air is exhausted from the outlet (not shown) of the heater 18 into the heater take off duct 74 which, in turn, conveys the flow of heated air into the vertical duct 76. The vertical duct 76 thereafter conveys the flow of heater air into the second duct means 78 via its outlet 92 and the inlet 100 of the second duct means 78. Within the second duct means 78, the flow of heated air is divided between the first, second and third chamber portions 102, 103, and 108. With respect to the first and second chamber portions 102 and 103, the flow of heated air is directed by the vents 105 against the windshield wiper arms 32 in the outside of the windshield 14. Additionally, the heated air is directed into the saucer-like depressions 60 of the support panel 42 and against the underside of the drive pivot 54. It should be understood that the flow of heated air prevents any build up of ice or snow around the drive pivot 54 or on the wiper arms 32, and also serves to defrost the outside of the windshield 14. With respect to the third chamber portion 108, the flow of heated air is directed by the vent 109 against the windshield wiper blades 52 and the outside of the windshield 14 to prevent a build up of ice and snow on the wipers 52 and defrost the windshield 14.

The foregoing disclosure relates to several embodiments of the invention which may be modified within the scope of the appended claims.

What is claimed is:

1. A de-icer for a vehicle having a windshield, windshield wipers supported by the vehicle and engageable with the windshield on its exterior surface, an engine compartment, and an engine compartment hood movable between open and closed positions and whose rearward edge is spaced forwardly from the windshield to define a transverse slot for housing the windshield wipers, comprising: first duct means for receiving and conveying a flow of heated air from a heater means toward the hood; second duct means formed integrally with the engine compartment hood and adapted to receive and convey the flow of heated air from first duct means when said hood is in its closed position, said second duct means being sealingly engageable with said first duct means when it is in its closed position and being disengageable with said first duct means when it is in its open position, and said second duct means having vent openings adjacent the rearward edge of the hood for directing the flow of heated air upon the outer side of the windshield and upon windshield wipers.

2. In an automotive vehicle having windshield wipers supported adjacent the lower edge of a windshield: an engine compartment hood hingedly supported for movement between opened and closed positions and comprising an outer panel and an inner panel fixedly secured thereto; a windshield and windshield wiper de-icer comprising first and second duct means, said first duct means for conveying a flow of heated air from a heater means, a second duct means being formed integrally with said engine compartment hood by said outer and inner panels and being adapted to receive the flow of heated air from said first duct means when said hood is in its closed position, siad second duct means having vent openings for directing the flow of heated air upon the outside of the windshield and the windshield wipers, and said de-icer also having sealing means between said first and second vent means when said hood is in its closed position to provide for a flow of heated air to pass therebetween.

3. In an automotive vehicle having windshield wipers supported adjacent the lower edge of a vehicle windshield for reciprocal pivoting movement across said windshield; an engine compartment hood hingedly supported for movement between open and closed positions and having its rearward end extending above said windshield wipers, said engine compartment hood comprising an outer panel and an inner panel fixedly secured to the underside of said outer panel; a de-icer for the outside of said windshield and said windshield wipers comprising first and second duct means, said first duct means comprising a heater take off duct and a vertical duct, said heater take off duct conveying a flow of heated air from a heater in the vehicle to said vertical duct, and said vertical duct for conveying said flow of heated air to a position immediately adjacent said inner panel of said hood, said second duct means comprising a thin manifold formed by said outer panel of said hood and a shallow embossed impression in said inner panel of said hood, said second duct means being adapted to receive the flow of heated air from said first duct means when said hood is in its closed position, said second duct means having first and second vent openings adjacent said rearward end of said hood for directing the flow of heated air upon the pivots of said windshield wipers and the outside of said windshield, said second duct means having a third vent opening adjacent the rearward end of said hood for directing the flow of heated air upon the wiper blades of said windshield wipers and the outside of said windshield; and sealing means carried by said first duct means for sealing the communication of the heated air between said first and second duct means when said hood is in its closed position.

4. In an automotive vehicle having windshield wipers pivotally supported adjacent the lower edge of a vehicle windshield for reciprocal movement across said windshield: an engine compartment hood hingedly supported for movement between the open and closed positions and having its rearward end extending adjacent to and above said windshield wipers and defining a vehicle opening adjacent the lower edge of said windshield, said engine compartment hood comprising an outer panel and an inner panel fixedly secured to the underside of said outer panel; a de-icer for said windshield wipers and the outside of said vehicle windshield, said de-icer comprising first and second duct means, said first duct means comprising a heater take off duct and a vertical duct, said heater take off duct having an inlet vent for receiving a flow of heated air from a heater in the vehicle and also having an outlet vent, said vertical duct having an inlet vent in sealed communication with said outlet vent of said heater take off duct for receiving the flow of heated air therefrom, said vertical duct having an outlet vent immediately adjacent the inner panel of said engine compartment hood when in its closed position, said outlet vent having sealing means thereon, said second duct means comprising a thin manifold in said engine compartment hood formed by said outer panel and a shallow embossed impression in said inner panel, said second duct means having an inlet vent through said embossed impression in said inner panel and adapted to abut said sealing means and to communicate with said outlet vent of said vertical duct when said hood is in its closed position to receive the flow of heated air therefrom, said second duct having first and second portions extending within said engine compartment hood and terminating in first and second vent openings adjacent the rearward end of said hood and adjacent pivots of said windshield wipers for directing the flow of heated air thereon and upon the outside of said windshield, said second duct having a third portion extending within said hood terminating in a third vent opening adjacent the rearward end of said hood and wiper blades of said windshield wipers for directing the flow of heated air thereon and upon the outside of said windshield.

* * * * *